Figure 5:
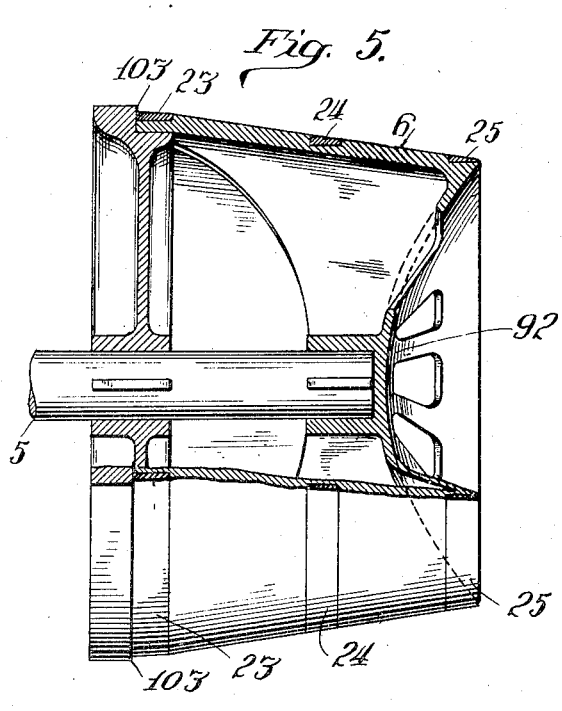

April 1, 1930.   A. H. SCHMIDTKE   1,752,856
METHOD AND APPARATUS FOR MAKING BASKETS
Filed March 25, 1926   5 Sheets-Sheet 1
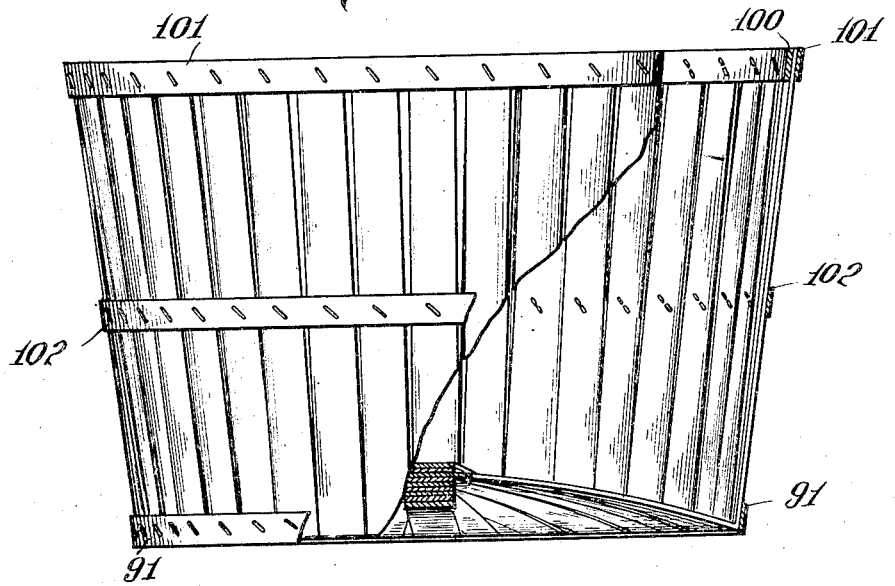
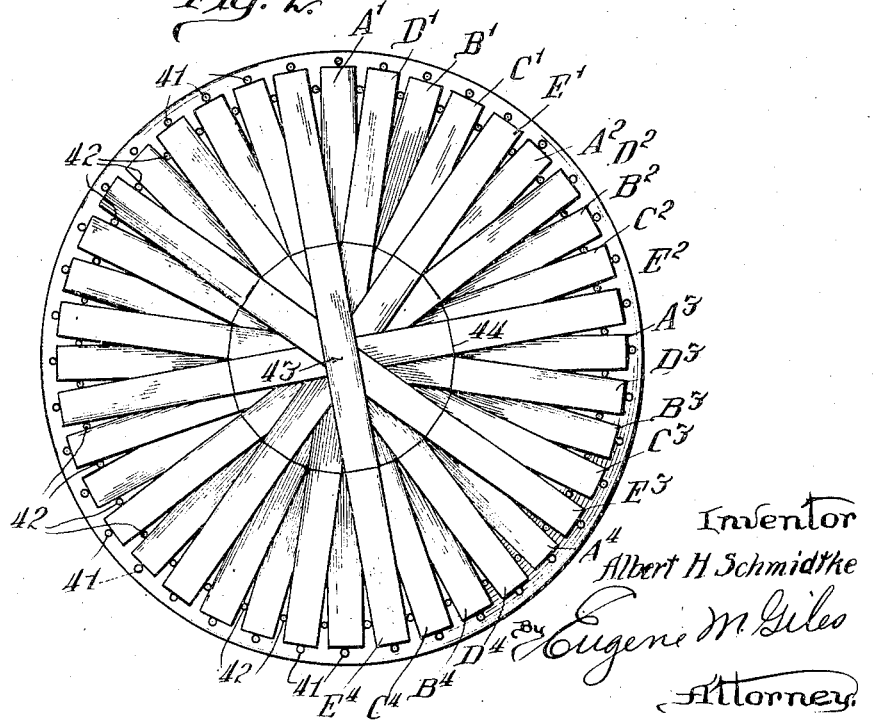
Inventor
Albert H Schmidtke
By Eugene M Giles
Attorney April 1, 1930.  A. H. SCHMIDTKE  1,752,856
METHOD AND APPARATUS FOR MAKING BASKETS
Filed March 25, 1926    5 Sheets-Sheet 2
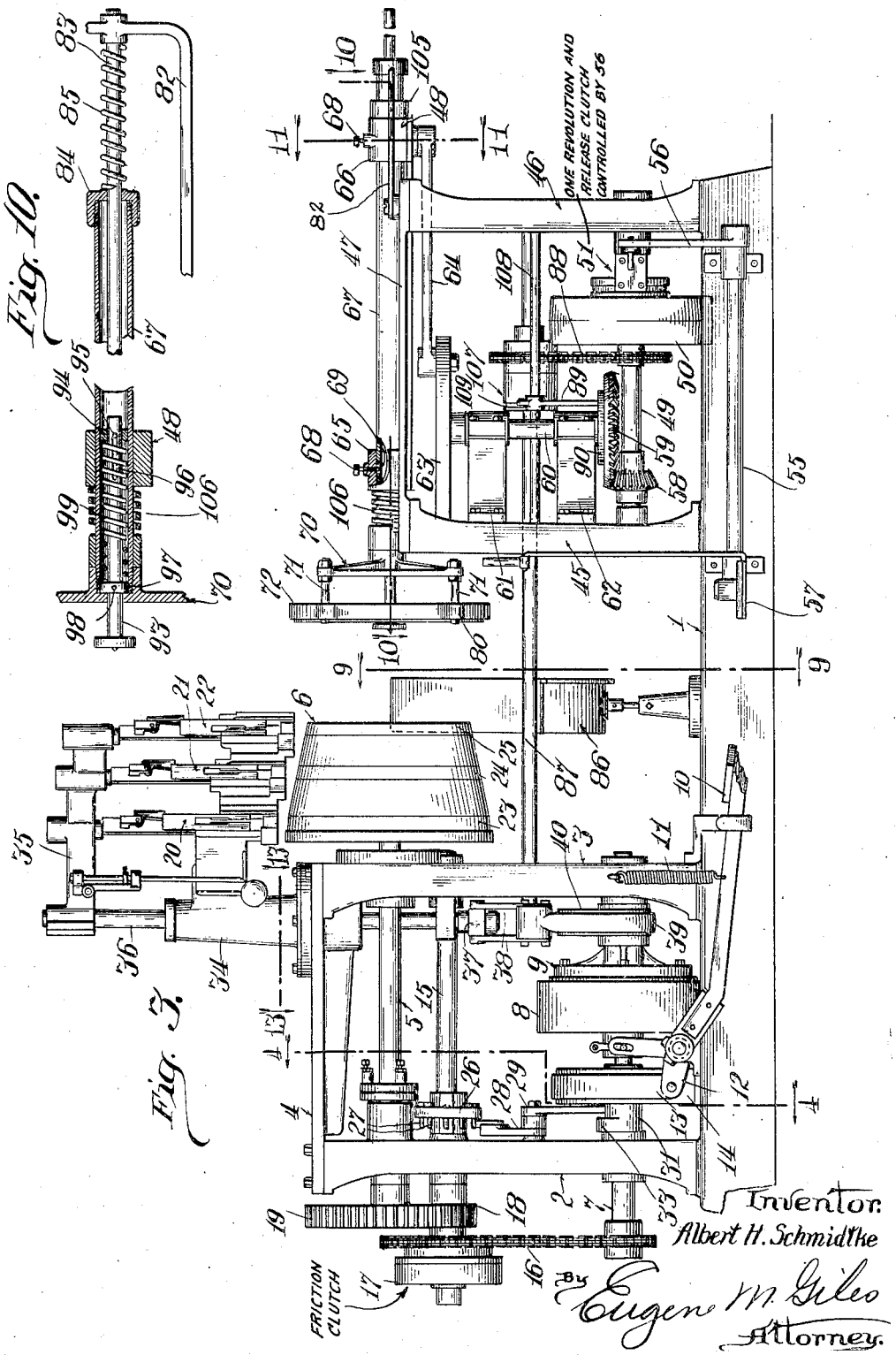

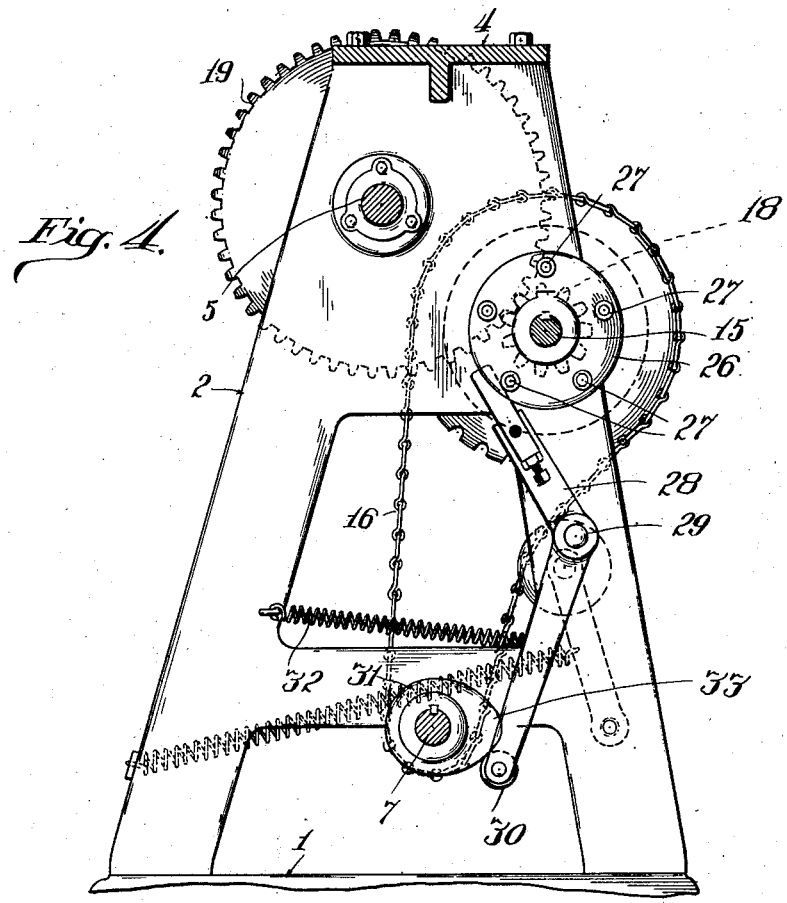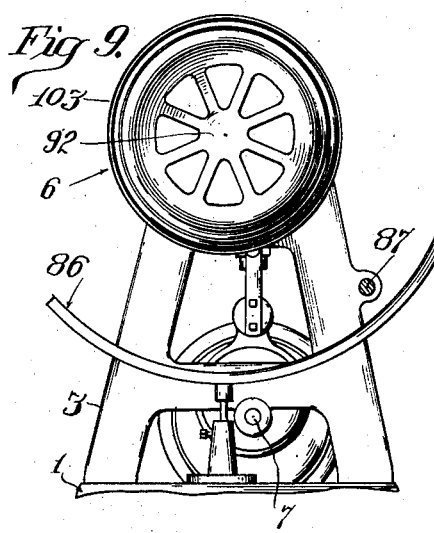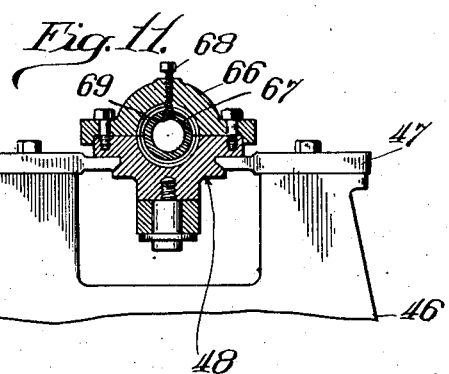

Inventor
Albert H. Schmidtke
By Eugene M. Giles
Attorney

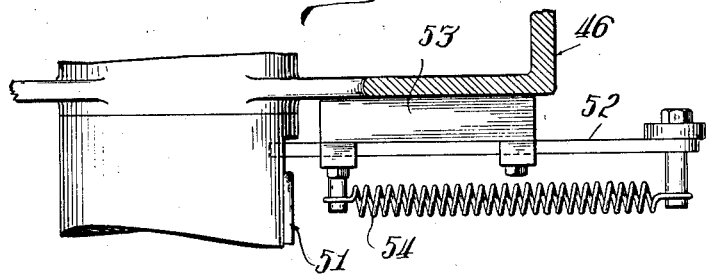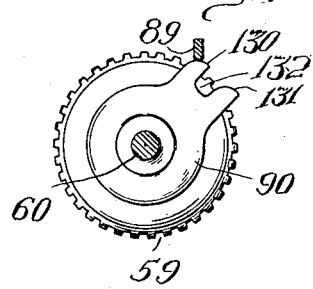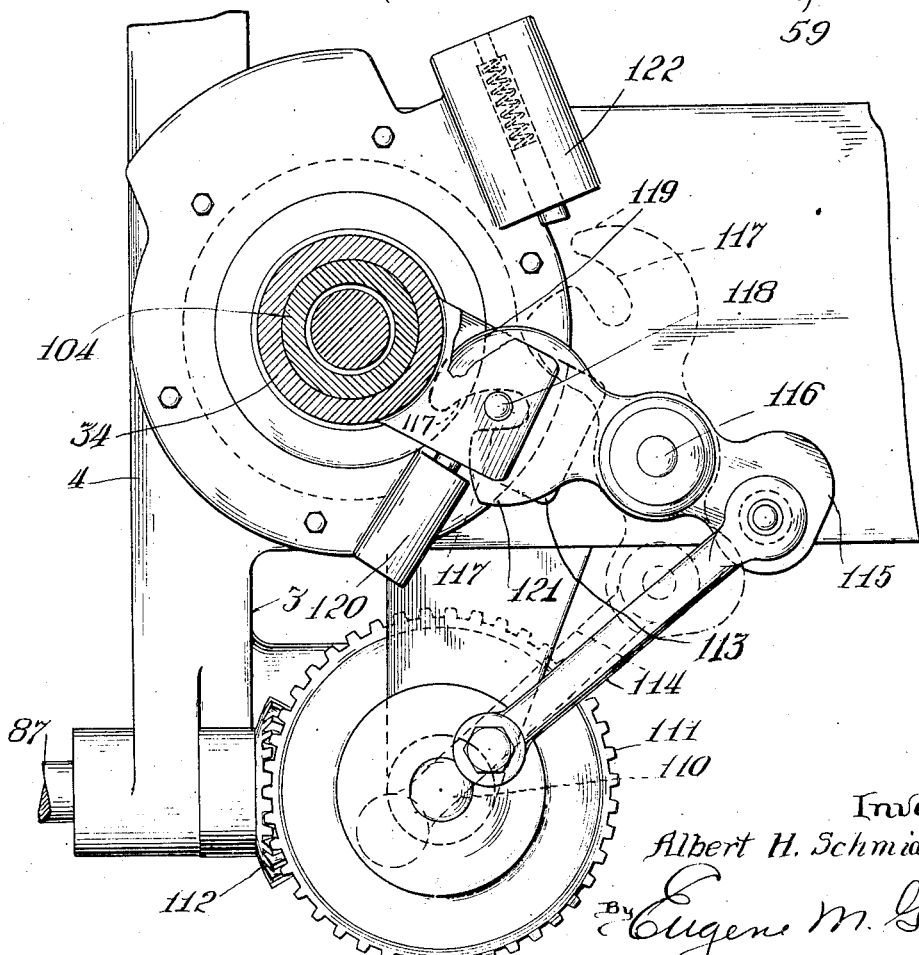

Patented Apr. 1, 1930

1,752,856

UNITED STATES PATENT OFFICE

ALBERT H. SCHMIDTKE, OF ST. JOSEPH, MICHIGAN, ASSIGNOR TO ST. JOSEPH IRON WORKS, OF ST. JOSEPH, MICHIGAN, A CORPORATION OF MICHIGAN

METHOD AND APPARATUS FOR MAKING BASKETS

Application filed March 25, 1926. Serial No. 97,220.

My invention has reference to a basket which is formed from a mat having a radial series of panels which are bent at an abrupt angle to the center portion of the mat to form an annular wall, and my invention also has reference to the method and apparatus for making baskets of this character.

It has been the practice for a long time to make what are known as round stave baskets, using a mat such as I employ in my present invention, with the ends turned up and secured to hoops to form the annular wall of the basket. Such baskets however, have a rounded bend of somewhat large radius where the side wall joins the bottom, and on account of this rounded bend and of the thinness of the panels which it is necessary to use, there is a tendency of the basket to yield or crush under pressure and this frequently permits the contents of the basket to be damaged, particularly in shipping and storage, as it is customary to stack the baskets one upon another. In order to avoid this objection to baskets of the round stave type above referred to, I bend the panels of the mat sharply at the juncture of the annular wall with the bottom so as to eliminate the undesirable rounded bend and thus provide a rigid straight sided annular wall which effectively resists yielding or crushing strains and protects the contents of the basket, and I also reinforce the lower end of the basket so as to hold the basket bottom rigidly in place and protect the corner or bend between the annular wall and bottom.

The principal objects of my invention are to provide a light weight basket which is strong and rigid; to avoid yielding or crushing of the basket under pressure; to avoid the rounded bend at the bottom which has been present in baskets of the character heretofore formed from a mat similar to that used in the manufacture of my present basket; to form the bottom and annular walls from a mat which is bent abruptly at the juncture of the annular side wall and the bottom; to provide the basket with a straight sided annular wall; to form the annular wall with an abrupt bend around the lower edge affording inturned portions which are connected with or form a part of the basket bottom; to construct a straight sided basket with an integral bottom which is formed so as to elevate the contents of the basket above the supporting surface; to arch the bottom of the basket to afford strength and rigidity; to hold the basket bottom rigidly in place by a confining band; to confine the lower end of the basket and the basket bottom by means of an annular band while the bottom is arched or pressed inwardly so as to permanently retain the basket bottom substantially in the pressed in position; to protect the sharp bend around the lower edge of the basket; to simplify and improve the construction of basket; and in general, to provide an improved basket and method and apparatus for making same.

On the drawings:

Fig. 1 is a side view of a basket made in accordance with my invention, portions thereof being broken away to disclose details of the construction;

Fig. 2 a plan view of the mat for making the basket, showing the manner in which the panels are laid up;

Fig. 3 a side view of a machine for making baskets in accordance with my present invention;

Fig. 4 a sectional view taken substantially on the line 4—4 of Fig. 3;

Fig. 5 a side view, partly in section, of the form on which the mat is shaped.

Figure 6:
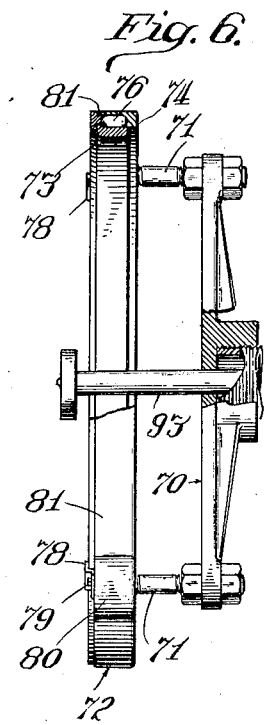
Figure 7:
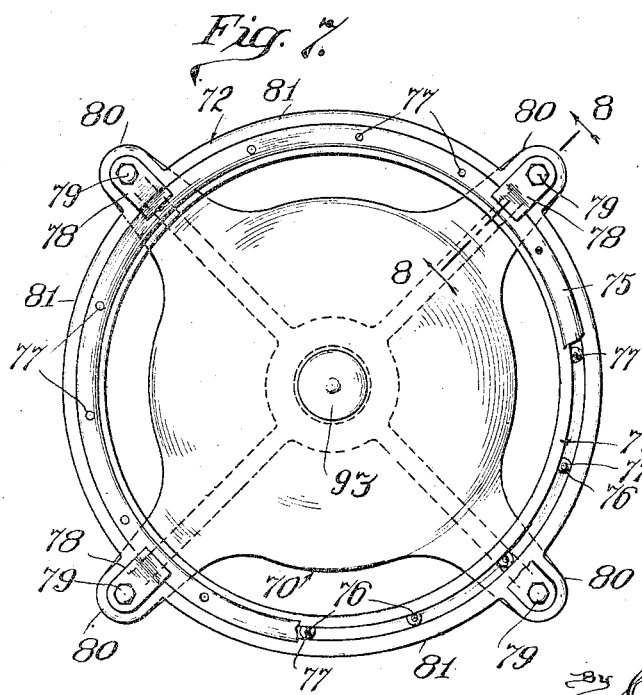
Figure 8:
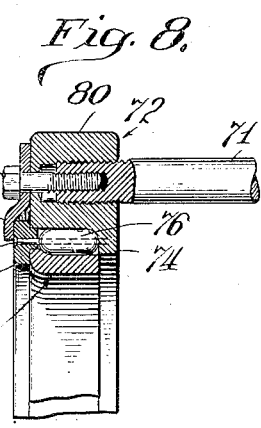

Fig. 6 a side view partly in section of the ram and former for shaping the mat around the form;

Fig. 7 a view looking at the front of the ram and former on Fig. 6;

Fig. 8 an enlarged detail sectional view on the line 8—8 of Fig. 7;

Fig. 9 a view taken on the line 9—9 of Fig. 3, showing the cradle for supporting a mat preparatory to shaping the latter around the form;

Fig. 10 a fragmentary sectional view on the line 10—10 of Fig. 3, with parts broken away;

Fig. 11 a sectional view on the line 11—11 of Fig. 3;

Fig. 12 a top view of the controlling mechanism for the clutch which operates the ram;

Fig. 13 a plan and part sectional view on the line 13—13 of Fig. 3, showing the mechanism for shifting the stapling mechanism; and Fig. 14 a plan view of the cam which controls the adjustment of the stapling device.

Referring to the drawings, the numeral 1 indicates the base of the machine which has a pair of spaced frames 2 and 3 adjacent one end, which are connected at their upper ends by a plate 4. A shaft 5 is journaled in the frames 2 and 3 near the upper end of the latter and has a tapered form 6 secured on the inner end. A main drive shaft 7 is journaled in the frames 2 and 3 near the lower end thereof and has a drive pulley 8 thereon, which is adapted to be connected with the shaft 7 for driving the latter by a friction clutch 9 which is controlled by the pedal 10. A spring 11 normally holds the pedal 10 in the elevated position at which time the friction clutch 9 is disengaged, and this pedal 10 has an extension 12 connected with a brake band 13 which cooperates with a brake drum 14 on the shaft 7 to engage the latter in the elevated position of the pedal 10 so that the shaft 7 will stop promptly upon release of the friction clutch 9. When the pedal 10 is depressed, the friction clutch is engaged with the pulley 9 and at the same time the brake band 13 is relaxed from the brake drum 14 so that the shaft 7 is free to operate.

A counter shaft 15 is journaled in the frames 2 and 3 above the shaft 7 and is operated from the latter shaft by a chain drive 16 through a friction driving mechanism 17 which exerts a constant driving tendency on the shaft 15 but is adapted to slip and permit the shaft 15 to remain inactive when rotation of the latter is prevented. A pinion 18 on the shaft 15 meshes with a gear 19 on the shaft 5 so that the form 6 is rotated from the shaft 7, the ratio of the gearing being such that the shaft 5 operates much slower than the shaft 7.

The form 6, around which the mat is shaped in the operation of making the basket, cooperates with a plurality of stapling devices 20, 21 and 22, which serve to secure hoops around the mat on the form 6 for holding the mat in the final form of the basket, the said form being provided with clinch rings or bands 23—24—25 which serve to bear the impact of and clinch the staples driven by the stapling devices 20, 21 and 22 respectively, and the form 6 is rotated in a step by step manner so as to apply the staples at predetermined interval around the basket and permit intervals of rest during which the stapling mechanisms perform their function.

For accomplishing the step by step operation of the form 6, the shaft 15 has a disk 26 fixed thereon and provided with a proper number of laterally extending pins or stops 27 which are adapted to be engaged against the upper end of a bell crank lever 28, which is pivoted at 29 to the frame 2. The lower end of the bell crank 28 is provided with a roller 30 which rides on the face of a cam 31 which is fixed on the shaft 7, the said cam 31 being formed so that during the larger part of the rotation of the shaft 7, the upper end of the bell crank 28 is held by the spring 32 in the path of one of the pins 27 so as to arrest the operation of the shaft 15, at which time the friction driving mechanism 17 is slipping but at the same time exerting a driving tendency which will cause the shaft 15 to rotate as soon as the upper end of the bell crank 28 is released from the pin 27. The stapling devices 20, 21 and 22 are operated by the shaft 7 in such a manner that a stapling operation is performed in each revolution of the shaft 7 and the cam 31 is formed with an enlargement 33 which operates momentarily when the stapling devices are retracted from the form 6 and rocks the bell crank 28 to release the upper end of the latter from engagement with the stop pin 27 so that the shaft 15 is free to be turned through the friction driving mechanism 17, and the upper end of the bell crank lever 28 is promptly returned by the spring 32 to the position in the path of the pins 27 so as to engage the next succeeding pin and arrest further operation of the shaft 15 as soon as the form 6 has been advanced the distance that the staples are to be spaced apart around the basket.

The stapling devices 20—21 and 22, which are of a well known form, comprise stationary portions which are carried by a bracket 34 and also have reciprocating portions which are carried by a bracket 35, which latter is secured to the upper end of a shaft 36 which extends downwardly through suitable bearings including a tubular standard 104 (see Fig. 13) on the plate 4, so as to be capable of reciprocating movement, and the lower end of this shaft is swiveled at 37 between a pair of straps 38 on an eccentric strap 39 which embraces an eccentric 40 on the shaft 7, whereby the shaft 36 is reciprocated for operating the stapling devices.

The basket is preferably formed from a mat composed of thin wooden panels or strips of veneer, laid up in the manner indicated in Fig. 2 on a plate or holder which has pins 41 for engaging the ends of the strips and pins 42 which engage between the ends of adjoining strips to facilitate the proper location of same, the strips being preferably arranged in the following manner: The strips $A^1$, $A^2$, $A^3$ and $A^4$ are successively laid in position at equal distances apart as indicated in Fig. 2, and then the series of strips $B^1$ to $B^4$, $C^1$ to $C^4$, $D^1$ to $D^4$ and $E^1$ to $E^4$ successively laid in a corresponding manner to fill in the spaces between the A strips as shown in Fig. 2 and the entire group of strips are stapled or fastened together in any convenient manner as indicated at 43 so as to hold the strips in the assembled form and form the mat from which the basket is to be made. This mat constitutes the bottom and side walls of the basket, the portions thereof within the line 44 of Fig. 2 forming the bottom, while the portions thereof at the outer side of the line 44 form the annular wall, the outer portions of the panels being bent at an abrupt angle along the line 44 into an annular tapered form as shown in Fig. 1, wherein the outer extremities of the panels are closed together to overlap and afford an effective enclosure. To facilitate the bending of the panels or strips along the line 44, each of the strips is preferably scored crosswise at the two places where the bends occur, these scorings forming a substantially circular line as at 44 in Fig. 2, such scoring being conveniently accomplished as the veneer sheet which is subsequently cut into the panels is shaved from the block or log.

This mat, which is shown in Fig. 2, and constructed as above described, is placed adjacent the outer end of the form 6 so that the central portion of the mat within the line 44 is in alignment with the outer end of the form 6 and is then folded around the annular face of the form 6.

For folding the mat around the form 6, a pusher or ram is mounted in alignment with the form and adapted to move to and from the latter. This ram is mounted on a pair of frames 45 and 46 which are spaced apart on the base 1 and are connected at their upper ends by a pair of spaced guide plates 47, which serve as a track for the carriage 48, which latter supports the ram and is adapted to slide in a direction to and from the form 6.

A drive shaft 49 is journaled in the frames 45 and 46 adjacent the lower ends of the latter and has a drive pulley 50 thereon with a positive clutch for interlocking the pulley with the shaft 49 at times when the latter is to be operated. The clutch mechanism which is indicated as a whole at 51, may be of any suitable type wherein a clutch pin or member is shiftable to and from engagement with the clutch lugs or recesses of the pulley 50 and is controlled by a longitudinally shiftable trip bar 52 carried by a bracket 53 on the frame 46 and normally held by the spring 54 in position to release and hold the clutch pin out of engagement with the pulley 50. By means of this arrangement, when the trip bar 52 is withdrawn from engagement with the clutch pin, the latter engages the shaft 49 with the pulley 50 and a complete revolution thereof takes place before the trip member 52 again engages and releases the clutch pin. This is a common form of clutch mechanism and details of the construction thereof are not given, it being understood that any form of positive clutch may be employed which permits a complete revolution of the shaft 49 to take place after each clutch releasing operation and wherein the clutch mechanism will be disengaged at the end of the revolution, provided that the clutch shifter 52 has in the mean time been returned to the normal position by the spring 54. A shaft 55 is journaled on the base 1 at the side as shown in Fig. 3, and has an arm 56 at the outer end connected with the clutch shifter 52 for operating the latter, and at the other end this shaft 55 is provided with a pedal 57 located adjacent the position of the operator at the center of the machine, and in the operation of the device it is contemplated that the pedal 57 will be only momentarily depressed to permit engagement of the clutch mechanism and then released so that the clutch shifter 52 may be returned promptly to the position to disengage the clutch mechanism at the completion of the revolution by the shaft 49.

A bevel gear 58 is fixed on the shaft 49 and meshes with a beveled gear 59 on the lower end of the upright shaft 60, which is carried by brackets 61 and 62 from the frame 45 and this shaft 60 has a crank disk 63 at the upper end connected by the link 64 with the outer end of the carriage 48 so that the latter is reciprocated along the guides 47 by rotation of the disk 63. The proportions of the gears 58 and 59 are such that the gear 59 and disk 63 make one-half of a revolution in each revolution of the shaft 49, and it will be observed therefore that when the pedal 57 is depressed to engage the clutch 51 and the shaft 49 makes a revolution, the carriage 48 is shifted in one direction along the guides 47 to the extremity of its movement and remains in such position until the pedal 57 is again released to engage the clutch 51, whereupon the revolution of the shaft 49 which then takes place, rotates the disk 63 another half turn and moves the carriage 48 to the other extremity of its movement, in which position it remains until the pedal 57 is again depressed.

The carriage 48 is formed with a pair of spaced bearings 65 and 66, in which a tubular shaft 67 is mounted to slide axially, being held against turning movement by set screws 68 engaging in slots 69 extending lengthwise of the tubular shaft 67; and is confined endwise by a collar 105 which is fixed on the shaft 67 and normally held against the bearing 66 by a stiff spring 106 on the tubular shaft 67, which is compressed between the former head 70 and the bearing 65, said spring 106 being provided to cushion the ram in the mat folding operation, and this tubular shaft has a head or spider 70 secured to the inner end in any convenient manner, as for example, by a threaded connection such as shown in Fig. 10. This head or spider has a plurality of stems 71, four being shown in the present case, which project forwardly therefrom and these stems 71 carry at their forward ends a circular frame 72, which is adapted to slip part way over the form 6 in the operation of folding the basket mat around the form. This frame 72 remains stationary during the operation of stapling the hoops around the folded mat on the form 6, being held against turning with the form 6 as the latter rotates, by the engagement of the set screws 68 with the slots 69 of the tubular shaft 67, said frame 72 being positioned in the final folding position and during the stapling operation between the stapling devices 21 and 22, so that said frame does not interfere with the operation of stapling, and the upper stems 71 which support the frame 72, are arranged at opposite sides of the stapling device 22 so that they do not interfere with the operation of the latter.

The circular frame 72 in itself does not serve to fold the mat around the form 6 and hold the mat in the folded position during the time that the hoops are stapled around the folded mat, but affords a mounting for an internal annulus 73, which is held in the frame 72 and is free to rotate therein so that it may readily turn with the form 6. The frame 72 is provided at the outer side with an inwardly extending flange 74 cooperating with a ring 75 at the opposite side to form a raceway between the frame 72 and annulus 73 for a plurality of roller bearings 76 which are arranged at intervals between the rings 72 and 73 and held in place by pins 77 which are engaged at their opposite ends in apertures in the ring 75 and the flange 74 and have the rollers 76 mounted thereon, and the ring 75 is held in place on the frame 72 by clamp plates 78 which are preferably secured to the frame 72 by bolts 79 that serve to secure the frame 72 to the stems 71. With this construction the internal annulus 73, while carried by the reciprocating folding mechanism, is entirely free to turn in the frame 72 and thus may be fitted sufficiently tight against the annular wall portion of the folded basket mat on the form 6 so that the portions of the panels which form the annular wall, are held snugly against the annular wall of the form 6 and at the same time the form and folded mat thereon are free to turn without resistance from the folding mechanism. Radial lugs 80 are provided on the frame 72 with sockets therein as shown in Fig. 8, to receive the ends of the stems 71, whereas the circumferential portions of the frame 72 between the lugs 80, are reduced in thickness, the portion across the upper part, being made quite thin as indicated at 81 in Fig. 6, so that the stapling mechanism may be positioned close to the form 6 as required.

In order to cushion the retracting operation of the ram, a spring bumper is provided at the outer end thereof, which is carried by a U-shaped bracket 82, which has the inner ends secured to the frame 46 and this bracket 82 has a stem 83 fixed thereto and projecting through a cap 84 on the outer end of the tubular shaft 67 with a spring 85 thereon and interposed between the cap 84 and the bracket 82, so that when the ram is thrown by the operation of the disk 63 to the outermost position, it strikes against and compresses the spring 85 and the latter thereby serves to cushion the outward movement of the ram.

In the operation of the machine, a mat such as shown in Fig. 2 is held in position adjacent the outer end of the form 6 so that when the folding ram is projected toward the form 6, the mat will be clamped against the outer end of the form 6 and folded against the annular face of said form, and in order to properly locate the mat preparatory to the folding operation, a substantially semi-circular wide band or cradle 86 is mounted on the base 1 at the outer end of the form 6 so as to hold the mat in the proper position, the end of the cradle 86 at the operator's side of the machine being preferably lower than the other end as shown, so that the mat may be conveniently placed therein.

The stapling devices 20—21 and 22 are located above and close to the form 6 in the stapling operation where they will interfere with the folding of the mat around the form 6, so that it is necessary to shift the stapling devices away from the stapling position before the mat is folded and to return the stapling devices to the stapling position above the form 6 preparatory to the stapling of the bands or hoops around the folded mat. To this end the bracket 34, which carries the stationary parts of the stapling mechanism, is pivoted on the tubular standard 104 which extends upwardly from the plate 4 and has the shaft 36 for operating the stapling devices passed therethrough, and the lower end of said shaft 36 is swiveled at 37, as hereinbefore indicated, to the eccentric links 38 so that the stapling mechanism may be readily swung to and from the stapling position.

The stapling devices may be swung manually to and from the stapling position, but I prefer to accomplish the adjustment thereof automatically in timed relation with the ram or folding mechanism so that after the stapling operations on the folded mat are completed, the stapling devices are swung laterally away from the form so that the completed basket may be readily removed, and after the ram has been projected forwardly to fold a mat around the form 6, the stapling devices are returned to the stapling position. To this end a counter shaft 87 is journaled in the frames 3, 45 and 46 and is adapted to be operated by the chain drive 88 which connects with a sprocket on the pulley 50 and is constantly driven thereby. A clutch 107 of the same type as the clutch 51 hereinbefore referred to, controls the operation of the shaft 87 from the chain drive 88 and upon engagement of the clutch mechanism 107 a single revolution of the shaft 87 takes place before the clutch 107 is disengaged.

A trip arm 89 in the form of a bell crank is pivotally mounted on the shaft 108 which is carried by the frames 45 and 46, and has the upper arm adapted to engage in the groove 109 of the clutch mechanism 107 to disengage the clutch mechanism and hold the latter inoperative until the arm of the bell crank 89 is lifted from the groove 109. The lower arm of the bell crank 89 extends down to a position adjacent the upper face of the gear 59 which has a cam member 90 attached thereto and provided with two adjoining cam portions 130 and 131 with a recess 132 therebetween, the former of which, namely the portion 130, rocks the bell crank 89 just as the ram is completing its inward stroke and lifts the upper arm of the bell crank from the groove 109 of the clutch mechanism 107 and allows the latter to engage and operate the shaft 87 a single revolution and thereby shift the stapling devices from the inoperative or outturned position to the operative position above the form 6. Immediately after the tripping operation of the cam portion 130, the lower arm of the bell crank 89 drops into the recess 132 and the upper end of the bell crank drops down into the groove 109 of the clutch mechanism 107 to disengage the latter as soon as the shaft 87 makes a complete revolution, and the parts are so timed that when the lower end of the bell crank 89 engages in the recess 132 between the cam portions 130—131, the clutch 51 is disengaged and the shaft 49 and cam 90 operated thereby discontinue operation until the pedal 57 is again depressed. After the basket has been completely stapled and the pedal 57 is depressed to operate the mechanism for retracting the ram from the form 6, the first movement of the gear 59 and cam 90 engages the cam portion 131 with the lower arm of the bell crank 89 thereby shifting same to permit engagement of the clutch 107, whereupon the shaft 87 makes another complete revolution and swings the stapling devices laterally away from the form 6.

The shaft 87 is connected in any suitable manner with the sleeve portion of the bracket 34 of the stapling devices for swinging the latter, as for example, by an upright shaft 110 which has a bevel gear 111 on the lower end meshing with the bevel pinion 112 on the end of the shaft 87 the ratio of the gears 111 and 112 being such that the shaft 110 makes one-half of a revolution at each complete revolution of the shaft 87. The shaft 110 has a crank disk fixed on the upper end and operatively connected with a laterally extending arm 113 on the sleeve or hub of the bracket 34 in any suitable manner to accomplish the desired movement. In practice I do not connect the crank disk on the upper end of the shaft 110 directly with the arm 113 of the bracket 34 but said disk is connected by the pitman or link 114 with the outer end of a lever 115 which is pivoted at 116 on the base of the standard 104 and said lever 115 has a slot 117 at the other end which cooperates with a pin 118 on the bracket arm 113 to swing the stapling devices. This slot 117 has a finger 119 at one side which serves to engage the pin 118 and throw the stapling devices to the inoperative position, wherein the bracket arm 113 stops against a spring cushioning device or bumper 120 while the finger 121 at the other side of the slot 117 has a beveled face at the end which has a wedging action against the pin 118 in the final movement of the stapling devices to the operative position, whereby the arm 113 is firmly clamped against the spring bumper 122 and the stapling devices thus securely held in the stapling position.

The basket of this application is preferably constructed from a mat made up somewhat as indicated in Fig. 2, with the intermediate portions of the slats or strips forming the bottom of the basket, and in practice I prefer to push the bottom of the basket inwardly to a sufficient extent and bind the lower edge of the basket with a hoop so that the basket bottom will be held in such position against sagging under the weight of the contents of the basket. In practice the basket bottom is pressed inwardly at the center so that it assumes a more or less arched or concave form as indicated in Fig. 1 and the bottom hoop or band 91 snugly encircles the lower end of the basket so as to hold the basket bottom substantially in an arched form.

To accomplish this formation of the basket bottom, the form 6 is provided with a concave recess in the outer end as indicated at 92 in Fig. 5, so that the bottom of the basket may be pushed therein when the mat is shaped around the form and the clinch ring 25 is located at the extreme end of the form so that it will fit down in the angle between the basket bottom and annular wall and permit the bottom hoop 91 to be applied at the lower end of the basket, said hoop being preferably located as shown in Fig. 1, so that it projects slightly beyond the lower edge of the annular wall of the basket and thereby bears the weight of the basket and its contents and protects the crease or bend from injury. For the purpose of pressing the center portion of the basket mat into the concave recess 92 of the form in the operation of making the basket, the ram is provided with a center pin 93 which exerts sufficient pressure to push the basket bottom in to the desired extent when the mat is folded around the form. This pin or rod 93 projects through an aperture in the spider or head 70 of the ram into the interior of the tubular shaft 67 and its inner end slides through an aperture in the collar or plug 94 which is secured in the tubular shaft 67 by the pin 95, the inner end of the rod 93 being preferably slotted as indicated at 96, so that the pin 95 may be inserted diametrically through the collar or plug 94. A collar 97 is fixed on the stem or rod 93 within the tubular shaft 67, by a pin 98 and a coil spring 99 is interposed between the collar 97 and the plug 94 to normally force the stem 93 outwardly to the position wherein the collar 97 engages against the central web portion of the head or spider 70. With this construction when the ram is projected forwardly, to fold the mat around the form 6, the pin 93 engages against the center of the portion of the mat which constitutes the basket bottom, and the spring 99 is of sufficient tension to press the center portion of the mat into the recess 92 of the form and hold it in such position while the hoops or bands are stapled around the annular portion of the mat, and when the hoop or band 91 is stapled around the lower end of the basket, the arched bottom is confined against expansion and is prevented from sagging under the weight of the contents of the basket.

Baskets of this character are commonly provided with inner and outer hoops 100 and 101 at the upper end, between which the upper edge of the annular wall is secured and also have an outer hoop 102 substantially midway between the upper and lower edges of the annular wall. The inner hoop 100 is placed on the form 6 before the mat is folded therearound, being located over the clinch ring 23, and the form is preferably provided with an annular flange or shoulder 103 or other suitable means adjacent the clinch ring 23, against which the upper inside hoop 100 is placed prior to the operation of folding the mat around the form. The hoops 91, 102 and 101 are fed into the machine in the usual manner through guides which locate the ends thereof in the proper position between the stapling devices 20—21 and 22 and their respective clinch rings 23—24 and 25, and after the ends of the strips which form the hoops have been stapled onto the shell, they are automatically drawn through the guides in the step by step movement of the form 6 and wound snugly around the folded mat on the form and stapled thereto.

In the operation of this machine, we start with the ram in the retracted position as shown in Fig. 3 and with the stapling devices swung away from the position in which they are shown in Fig. 3, so that the mat may be folded around the form 6. A hoop 100 is then placed on the form 6 against the stop shoulder 103, and a mat such as shown in Fig. 2 is then set up on edge in the cradle 86 and the pedal 57 momentarily depressed. Thereupon the clutch 51 is permitted to engage the shaft 49 with the pulley 50 and a single revolution of the shaft 49 takes place since the pedal 57 has in the meantime been released and the clutch shifting member 52 accordingly returned to the clutch releasing position. The single revolution of the shaft 49 causes the disk 63 to make a half revolution which projects the carriage 48 forwardly, thereby clamping the mat against the end of the form 6 and folding the portion of the mat outside of the line 44 of Fig. 2 around the annular face of the form 6, and at the same time the pin 93 on the form engages the center portion of the mat and pushes it into the recess 92 at the bottom of the form, thereby giving the portion of the mat at the outer end of the form 6 a somewhat concave form. In view of the fact that the final movement of the disk 63 swings the inner end of the link 64 substantially in a transverse direction, such final movement affords very little movement of the ram and compresses the spring 106 somewhat. In this final movement the portion 130 of the cam 90 operates the clutch controlling crank 89 so that the shaft 87 is operated by the chain drive 88 and swings the stapling devices to the position shown in Fig. 3, whereupon the clutch 107 is disengaged.

The bands which form the hoops 91, 102 and 101, are then started in position under the stapling devices 22, 21 and 20 respectively, whereupon the pedal 10 depressed and the shaft 7 is thereby clutched to the pulley 8 by the friction clutch 9 and in each revolution thereof the stapling devices are operated to drive staples through the hoops 91, 102, the hoops 100 and 101 and also the panels which compose the annular wall of the basket. During each retracting movement of the stapling devices, the form 6 is advanced through the friction driving mechanism 17 and the cam 31 which controls the operation thereof and as long as the pedal 10 is depressed, the stapling mechanism and the form advancing mechanism continue to operate alternately and staple the hoops to the annular wall of the basket at intervals therearound. As soon as the bands which compose the hoops 101, 102 and 91 have been entirely stapled around the folded mat, pressure on the pedal 10 is relaxed and the stapling devices and form advancing mechanism discontinue operation. The pedal 57 is then temporarily depressed and the shaft 49 makes another revolution, thereby rotating the disk 63 a one-half turn and withdrawing the ram or former from the form 6. As the bevel gear 59 and cam 90 start to operate the portion 131 of the cam 90 engages the bell crank 89 so that the clutch 107 is engaged and the shaft 87 thereby operated to swing the stapling devices to the inoperative position and this occurs before the ram attains any substantial retracting effect from the disk 63. The completed basket is then withdrawn from the form 6 and another mat placed in the cradle or support 86, and the operation of the machine above described is repeated.

While I have shown and described my invention in a preferred form, I am aware that various changes and modifications may be made without departing from the principles of my invention, the scope of which is to be determined by the appended claims.

I claim as my invention:

1. In an apparatus of the class described, the combination of a tapered form having a narrow extended edge around the smaller end, a folder adapted to embrace the smaller end of the form for clamping a mat against the extended edge of the form and folding an annular portion of the mat against the tapered face of the form, means for pushing the center portion of the mat within the extended edge to internally arch said portion and form a sharp bend between the center and annular portions of the mat, and mechanism for applying a confining band around the folded mat on the form to embrace the aforesaid sharp bend and retain the arched form of the portion of the mat within the extended edge of the form.

2. In an apparatus of the class described, the combination of a tapered form having an extended narrow edge around the smaller end, means for rotating the form in a step by step manner, a stapling device at the smaller end of the form, a folder comprising a ring movable to positions at opposite sides of the stapling device and adapted to embrace the form for holding a basket shell thereon during the operation of the stapling device and a projection on said folder movable to and from a position within the extended edge of the form.

3. In a machine for making frusto-conical baskets with an arched bottom, the combination of a work holder having means for arching the basket bottom and holding the marginal edge of the latter at an abrupt angle to the adjoining edge of the basket side wall, and a hoop applying device for applying a hoop on the smaller end of the basket over the juncture of said abrupt angled portions of the bottom and side wall.

4. In a machine for making frusto-conical baskets with an arched bottom, the combination of a basket support, means co-operating therewith to arch the entire bottom of the basket and form an acute angled juncture of the side wall and bottom of the basket, and a hoop applying device adapted to apply a hoop around the smaller end of the basket side wall at the juncture of the side wall and arched bottom.

5. In a machine for making frusto-conical baskets the combination of a frusto-conical form having a projecting peripheral edge around a recess at the smaller end of the form, means relatively movable to and from said recess and co-operating with said peripheral edge to arch the bottom of a basket on said form, and a fastener applying device co-operating with the outer side of said projecting peripheral edge to fasten a hoop around the lower end of the basket on the form at the juncture of the basket side wall and arched bottom.

6. In an apparatus of the class described, the combination of a frusto-conical form having a reentrant portion at the smaller end forming a marginal narrow edge portion around the end of the form, means relatively movable with respect to the form so as to enter said reentrant portion and conform the edge of the basket bottom to the shape of the form, and a hoop attaching device co-operating with said marginal edge portion of the form to secure a hoop to the lower end of the basket on the form at the juncture of the basket side wall and bottom.

7. The method of making a basket which comprises providing a form the front end of which is recessed and has a narrow projecting edge around the recess; providing a blank larger than said end of the form and applying it to said end and folding the parts at the outer side of said projecting edge sharply about said edge at an abrupt angle to the parts of the blank at the inner side of said projecting edge to define the bottom and form the sides or body of the basket; holding the basket parts in this relation and applying a band to enclose the body and bottom of the basket at the annular edge so formed to maintain the basket parts in this relation.

8. The method of making a basket which comprises providing a form the front end of which is recessed and has a narrow projecting edge around the recess; providing a blank larger than said end of the form, scoring said blank on a line corresponding to said projecting edge of the form and applying the blank to said end and folding the parts at the outer side of said projecting edge sharply about said edge at an abrupt angle to the parts of the blank at the inner side of said projecting edge to define the bottom and form the sides or body of the basket; holding the basket parts in this relation and applying a band to enclose the body and bottom of the basket at the annular edge so formed to maintain the basket parts in this relation.

9. The method of making a basket, comprising the scoring of a plurality of staves, at predetermined points placing the staves crosswise and fastening them together at their centers to form a disk-like web or blank, and bending all the staves at their scored points and causing the staves to assume basket form and pressing the staves throughout the circumference of the basket at a point between the top and bottom of the basket and thus holding the staves in position, stapling top and bottom hoops to the basket staves, the scoring of the staves determining a place of bending which defines the annular boundary edge of the bottom of the basket and facilitates flattening thereof, and the securing of the hoop immediately adjacent this bend so located maintaining the bottom so defined.

10. A method as specified in claim 9, comprising the pressing of the bottom of the basket so that said bottom shall have an outside substantially flat surface after the bending of the staves and before and during the fastening of the hoops.

11. A basket-making machine comprising co-operating elements for bending staves in a manner to provide the basket with downwardly tapered side walls and a bottom lying within the length of the basket side wall, with a circular bottom corner edge where the sides join the bottom, devices for positioning and stapling an outside hoop on the basket about said circular bottom edge, so that said hoop will form the bottom rim of the basket, and devices for stapling inner and outer hoops on the basket flush with the upper edge thereof.

12. A structure as specified in claim 11, said co-operating elements comprising a rotary basket form for engaging the inside of the basket, and comprising a non-rotatable mold disposed in position to receive the said basket form and shape the basket thereon, said mold having rotary means to grip and rotate the basket in unison therewith and with said basket form.

13. A structure as specified in claim 11, said co-operating elements comprising a non-rotatable mold to receive the basket materials, a form for engaging the inside of the basket, co-operating with said mold to shape the basket, and said mold having a rotary member for engaging and gripping the bottom of the basket, for causing the basket form to rotate with the basket thereon during the stapling of said hooks in place.

14. In an apparatus of the class described, the combination of a frustro-conical form having a recess and narrow projecting edge at the smaller end, a ram relatively movable to and from the recessed end of the form for bending the basket at an abrupt angle over said projecting edge and pushing the center portion of the bottom of the basket on the holder into the aforesaid recess, and mechanism cooperating with said projecting edge for securing a confining band around the basket at the recessed end of the holder so that said band extends across the marginal edge of the basket bottom.

15. The method of reinforcing a basket bottom of crossed diametrically arranged panels having integral extensions at the ends forming the basket side walls, which consists in arching the basket bottom and securing upturned portions of said extensions along the periphery of the arched bottom within a basket-bottom embracing-hoop to maintain the bottom in its bulged condition and under tension.

16. The method of reinforcing a basket bottom of crossed panels having integral upturned extensions at the ends forming the basket side walls, which consists in arching the basket bottom and securing the lower ends of said side wall extensions within a basket-bottom embracing-hoop to main the bottom in its bulged condition and under tension.

17. The method of making a basket which consists in forming a mat of crossed panels, then bending the end portion of the panels laterally from the plane of the center portion of the mat to form the basket side walls, and arching and circumferentially contracting the center portion of the mat to form a bulged bottom for the basket, then securing the edge of the side wall along the periphery of the basket bottom to the inner side of a basket bottom encircling hoop to maintain the bottom in its bulged condition and under tension.

18. In a machine for forming a basket with frusto-conical side wall and upwardly bulged bottom, the combination of co-operable basket shaping devices, one of which comprises a frusto-conical form with recess in the smaller end and the other of which has means for pressing the basket bottom into the recess of the form and holding the basket side walls against the periphery of the form, and means at the outer side of and cooperating with the smaller end of the form to secure a hoop around the basket side wall on the form substantially at the juncture of the bottom and side wall of the basket.

19. In a machine of the class described the combination of a pair of co-operable basket shaping devices one of which comprises a rotary frusto-conical form with a recess at the smaller end and an extended edge therearound and the other of which devices has a former adapted to receive the form therein, means for moving one of said devices to press the center of a basket mat into the said recess of the form and to bend the mat over the extended edge of the form and hold it against the periphery of the form, and a fastener applying device operable at the outer side of and cooperating with said extended edge to secure a hoop to the basket mat around the outer side of the extended edge of the form.

ALBERT H. SCHMIDTKE.